Figure 1:
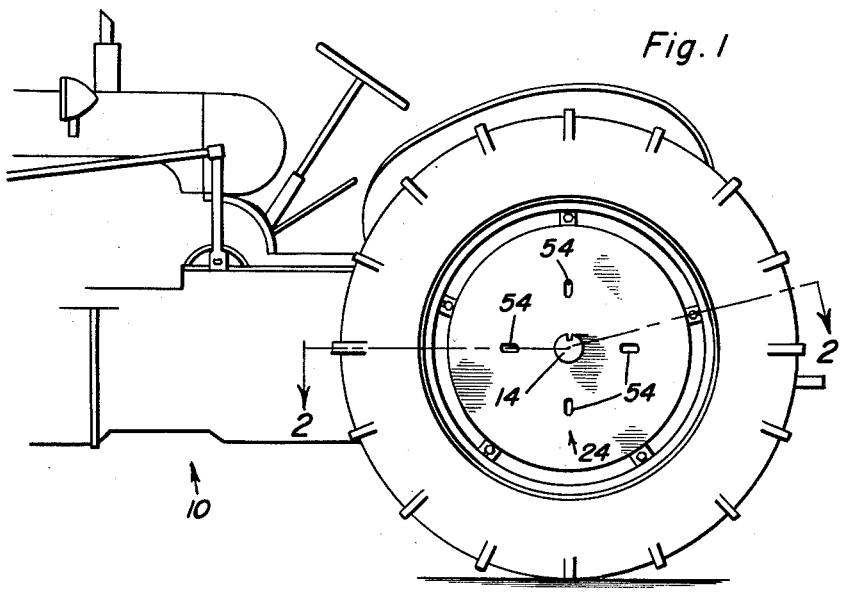

Feb. 5, 1957 C. T. CAMERON 2,780,497
WHEEL WEIGHT
Filed June 30, 1954

Carl T. Cameron
INVENTOR.

United States Patent Office 2,780,497
Patented Feb. 5, 1957

2,780,497
WHEEL WEIGHT
Carl T. Cameron, Burr, Nebr.

Application June 30, 1954, Serial No. 440,325

2 Claims. (Cl. 301—41)

This invention relates in general to attachments for tractors, and more specifically, to an improved wheel weight for a tractor rear wheel.

It has been found in the past that a simple traction increasing expedient is the increasing of the weight of the rear wheels of a tractor. In many instances during farming operations, it is highly desirable to increase the traction of the rear wheels of a tractor, yet, in many other instances, it is very undesirable to have the weight of the rear wheels of a tractor increased. Therefore, there must be provided means for increasing the weight of rear wheels of a tractor which is of such a nature whereby the weight may be added or removed as desired with a minimum of effort.

There have been utilized many methods in the past of increasing the weight of tractor wheels. A simple example is the filling of the tires of the real wheels with water. However, when it is desired to remove the water, the water must be drained with special equipment, and then, there must be provided an air compressor for pumping the tires up. It will be readily apparent that this cannot be easily done in the fields. There also have been provided wheel weights in the form of iron weights and the like which are attached to the individual wheels. However, these wheel weights are extremely heavy and are extremely difficult to place. For example, many of the wheel weights weigh up to 200 pounds, and cannot be positioned by a single person without the use of a chain hoist or the like.

It is therefore the primary object of this invention to provide an improved wheel weight which is extremely light in construction and at the same time, is adapted to greatly increase the effective weight of a tractor wheel.

Another object of this invention is to provide an improved wheel weight which is of such a construction whereby it may be conveniently attached to a tractor wheel without the use of any special fittings, the wheel weight being attachable with the lug bolts of the tractor wheel.

A further object of this invention is to provide an improved wheel weight whose over-all weight may be varied as desired, by merely filling the wheel weight with a desired material and the desired amount of such material.

A still further object of this invention is to provide an improved wheel weight for tractors whose initial weight is extremely light as compared to the effective over-all weight of such wheel weight.

Figure 2:
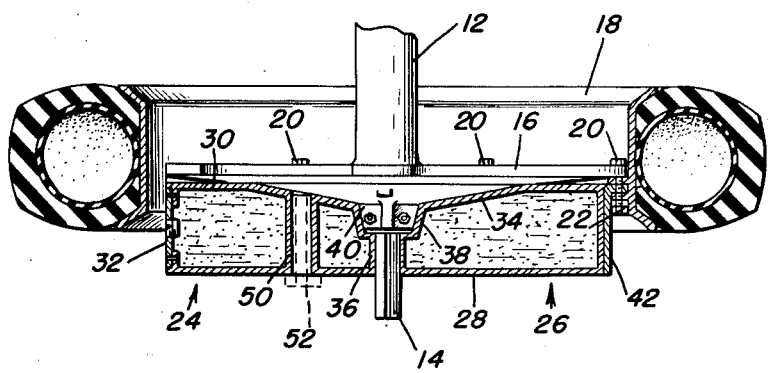
Figure 3:
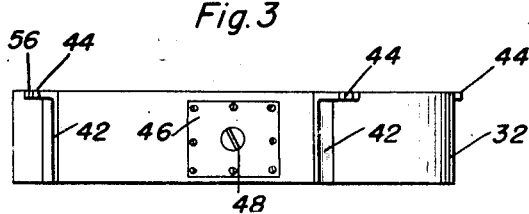

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary elevational view of a rear portion of a conventional farm tractor provided with the wheel weight which is the subject of this invention;

Figure 2 is an enlarged fragmentary substantially horizontal sectional view taken along the section line 2—2 of Figure 1 and shows both the internal construction of the wheel weight and its relationship to the rear tractor wheel to which it is attached; and Figure 3 is an enlarged top plan view of the wheel weight in a rotated position and shows the relationship of closures for facilitating the filling and emptying of the wheel weight with both granular materials and liquid.

Referring now to the drawings in detail, it will be seen that there is illustrated in Figures 1 and 2 a conventional farm tractor which is referred to in general by the reference numeral 10. The farm tractor 10 includes a rear axle housing 12 which has projecting therethrough a drive axle 14. Suitably carried by the drive axle 14 is a mounting plate 16 to which a rear wheel 18 is secured by lug bolts 20 which have removably threaded thereon lug nuts 22.

Secured to the rear wheel 18 by the lug bolts 20 and the lug nuts 22 is the wheel weight which is the subject of this invention, the wheel weight being referred to in general by the reference numeral 24. The wheel weight 24 includes a hollow drum which is referred to in general by the reference numeral 26. As is best illustrated in Figure 2, the drum 26 includes an outer circular plate 28 and an inner circular plate 30, the plates 28 and 30 being connected by an annular peripheral rim member 32. The inner plate 30 is provided with a dished portion 34 to provide clearance for projecting portions of the mounting plate or drum 16 as the case may be.

It is to be noted that the drum 26 also includes a central sleeve 36 which extends between the outer plate 28 and the inner plate 30. The sleeve 36 is of a size to have received therethrough the drive axle 14. The sleeve 36 also includes an enlarged inner portion 38 which provides clearance for a nut 40 which retains the mounting plate 16 in an adjusted position on the drive axle 14.

In order that the drum 26 may be secured to the rear wheel 18, there is secured to the annular member 32 a plurality of circumferentialily spaced L-shaped lugs 42. Each of the lugs 42 includes a rearwardly extending inner portion 44 which is receivable over the associated one of the lug bolts 20 and which is clamped against the associated portion of the mounting plate 16 by one of the lug nuts 22.

It is the intention of this invention that the drum 26 be filled with a suitable weighing material or liquid as the need be. In order that granular material may be placed within the drum 26, the annular rim member 32 is provided with a removable cover plate 46. After the cover plate 46 has been removed, granular material, such as sand or the like, may either be placed into the drum 26 or removed therefrom, as desired. It is to be understood that the cover plate 46 is sealed with respect to the annular member 32 so as to be watertight.

It is also intended that the drum 26 contain a suitable liquid, such as water. In order that the liquid may be placed into the drum 26 and removed therefrom, there is provided in the closure plate 46 a removable closure plug 48. The closure plug 48 may be easily removed by either a special wrench or a screwdriver, as the case may be.

The wheel weight 24, as described above, is limited to rear wheels of tractors having a large bolt circle. In the case of rear tractor wheels having small bolt circles, the wheel weight is also so constructed whereby it may be secured to such tractor wheels. As is best illustrated in Figures 1 and 2, the drum 26 is provided with a plurality of sleeves 50 extending between the outer plate 28 and the inner plate 30. The sleeves 50 are circumferentially spaced and intended for the reception of lug bolts, such as the lug bolts 52. As is best illustrated in Figure 1, the sleeves 50 present elongated openings 54 through the wheel weight to facilitate the securing of the wheel weight on tractor wheels having a slightly varying bolt circle diameter. Also, the flanges 44 of the lugs 42 may be provided with elongated slots 56 to compensate for a slight variance in the bolt diameter of large bolt circled wheels.

It is the intention of this invention that each of the wheel weights 24 be relatively light, weighing between 50 and 60 pounds. Thus, it will be seen that each wheel weight may be easily handled by an operator of the tractor and placed or removed without any special tools, merely by removing the lug bolts of the wheel of the tractor and then placing the wheel weight in position. Inasmuch as the total weight of a pair of wheel weights is only slightly over 100 pounds, it will be seen that by continuously utilizing the wheel weights, there would be little difference between the over-all weight of the tractor without the wheel weights and when provided with the wheel weights, the difference being substantially the same as that between a heavy man and a light man.

When it is desired to increase the traction of the tractor 10, the wheel weights may have their drums filled with the desired amount of water to produce the desired traction. The wheel weights 24 are so designed whereby they will carry approximately 300 pounds of water. If greater traction is desired, the water may be removed and the drums of the wheel weights filled with sand. The effective weights of the wheel weights will then be increased to approximately 600 pounds each.

From the foregoing, it will be readily apparent that there has been provided a wheel weight which is readily adaptable to tractors without making any changes whatsoever therein and which initially is so light that it may be easily positioned by one man. However, the over-all effect of the wheel weights is to provide a weight on the rear wheels of a tractor which is the maximum which will be required under normal circumstances, if not all circumstances.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A readily applicable and removable tractor wheel weight the heaviness of which may be varied, according to varying needs and requirements comprising a hollow drum which, when empty, weighs some fifty or sixty pounds so that it is possible for the average individual to carry it handily, attach it to or detach it from the complemental rear tractor wheel and otherwise handle it, said drum embodying inner and outer spaced circular walls having their outer peripheral edges connected by an annular web providing a rim member, said rim member having an opening therein at a predetermined place, a readily applicable and removable closure plate attached to said rim member normally closing said opening and serving to facilitate filling and emptying the drum with a material to increase the then existing weight to the desired degree of heaviness, said plate having a hole therein, a readily applicable and removable plug closing said hole, a plurality of circumferentially spaced L-shaped members secured to said rim member and embodying lugs releasably connectable with existing lug bolts on the tractor wheel construction.

2. A readily applicable and removable tractor wheel weight the heaviness of which may be varied according to varying needs and requirements comprising a hollow drum which, when empty, weighs some fifty or sixty pounds, making it possible for the average individual to carry it handily, attach it to or detach it from the complemental rear tractor wheel, and to otherwise handle it, said drum embodying inner and outer spaced circular walls having their outer peripheral edges connected by an annular web providing a rim member, said rim member having an opening therein at a predetermined place, a readily applicable and removable closure plate attached to said rim member, normally closing said opening and serving to facilitate filling and emptying the drum with a material to increase the then existing weight to the desired degree of heaviness, said closure plate having a hole therein, a readily applicable and removable plug closing said hole, said drum having a central opening therethrough for accommodation and reception of a tractor drive axle, said plates having aligned apertures and sleeves extending between the plates at circumferentially spaced points and aligned with their respective apertures and adapted to accommodate lug bolts, and attaching fittings secured to said rim member and embodying lugs releasably connectible with existing lug bolts on the tractor wheel construction.

References Cited in the file of this patent

UNITED STATES PATENTS

| | | |
|---|---|---|
| 953,299 | Schneider | Mar. 29, 1910 |
| 1,368,535 | Allen | Feb. 15, 1921 |
| 2,243,380 | Kinney | May 27, 1941 |